United States Patent
Balfour

(10) Patent No.: US 6,449,610 B1
(45) Date of Patent: Sep. 10, 2002

(54) MEMORY MEDIA AND METHOD OF PROCESSING DATE DATA USING PSEUDO ZONED DECIMAL FORMAT

(75) Inventor: Leslie Charles Balfour, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/277,711

(22) Filed: Mar. 26, 1999

(51) Int. Cl.$^7$ ............................................ G06F 17/30
(52) U.S. Cl. ................................ 707/6; 707/1; 707/10
(58) Field of Search ............................ 707/1–10, 101, 707/102

(56) References Cited

U.S. PATENT DOCUMENTS

| | | |
|---|---|---|
| 3,986,015 A | 10/1976 | Gooding et al. |
| 4,001,570 A | 1/1977 | Gooding et al. |
| 4,021,655 A | 5/1977 | Healey et al. |
| 4,141,005 A | 2/1979 | Bonner et al. |
| 4,802,088 A | 1/1989 | Rawlinson et al. |
| 5,053,953 A | 10/1991 | Patel |
| 5,276,891 A | 1/1994 | Patel |
| 5,278,978 A | 1/1994 | Demers et al. |
| 5,758,336 A | 5/1998 | Brady |
| 6,003,028 A * | 12/1999 | Koenig ............................ 707/6 |
| 6,065,004 A * | 5/2000 | Soeder ........................... 707/6 |
| 6,237,002 B1 * | 5/2001 | Eichen .......................... 707/101 |

OTHER PUBLICATIONS

IBM Technical Disclosure Bulletin, vol. 15, No. 7, Dec. 1972, pp. 2123–2124, "Zoned Decimal Arithmetic".
IBM Technical Disclosure Bulletin, vol. 15, No. 7, Dec. 1972, pp. 2097–2098, "Zoned or Packed Decimal Operand Detector".

* cited by examiner

Primary Examiner—Hosain T. Alam
Assistant Examiner—Anh Ly
(74) Attorney, Agent, or Firm—Ohlandt, Greeley, Ruggiero & Perle, L.L.P.; Daniel P. Morris

(57) ABSTRACT

A memory media and method of processing date data expressed in a pseudo zoned decimal format The pseudo zoned decimal format differs from the zoned decimal format in that the value of a character contained in the higher order field that corresponds to the F character of the zoned decimal format is permitted to vary in hexidecimal value from 0 to E to represent century information, but is not permitted to have a value of F. This character is examined to detect whether its value is F or a value in the range from 0 to E. If the value is F, the year data is converted to pseudo zoned decimal format in accordance. with century data. If the value is in the range from 0 to E, the value is added to a base century to obtain the proper century.

10 Claims, 2 Drawing Sheets

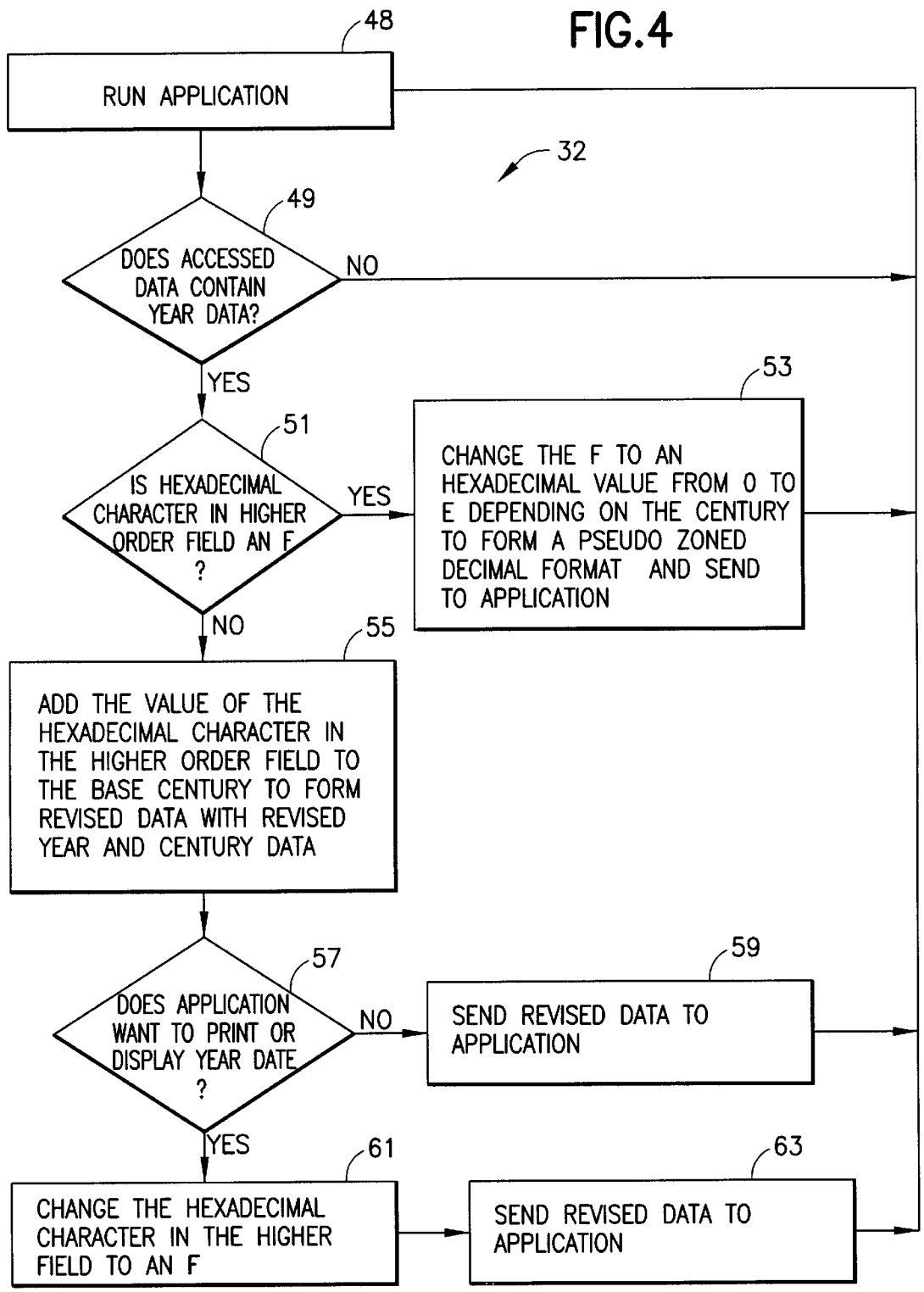

MEMORY MEDIA AND METHOD OF PROCESSING DATE DATA USING PSEUDO ZONED DECIMAL FORMAT

FIELD OF INVENTION

This invention relates to a memory media and a method controlled thereby for avoiding calculation ambiguities which result from the use of year dates from the year 2000 and forward and, more particularly, to an improved date format and method for the use thereof which avoids such calculation ambiguities and, at the same time, requires no modification of the size of date fields already present in current software.

BACKGROUND OF INVENTION

Software applications use dates in a myriad of operations, from complex financial transactions to the expiration dates of driver's license and credit cards. Many such applications base their calculations on dates, subtracting two-digit year values from one another to arrive at a calculation result. For example, calculations of interest on a 5-year certificate of deposit involves the subtraction of the CD's issue date from the current date and a determination of interest based upon the difference. This is no problem if the CD matures in 1999, but if it matures in 2001, the same computations can result in an error message or worse.

In the year 2000, the two year digit indications start over at "00", and unless something is done to distinguish such dates, they will appear to precede the year 1900—or so it will seem to many programs that use only the year's last two digits for dates. The same problem is present in programs which process invoices, payrolls, credit card transactions, bill payments, inventory systems, databases that sort by year and many other computer operations.

In the early days of data processing, storage space was at a premium and it was decided to use two digits for the year indication. As a result, most programs today employ two bytes of EBCDIC data to indicate the last two decimal values of the year. While it appears straightforward to convert a two byte decimal year indication to a four decimal year indication, the problem is that a monumental number of programs must be. searched and corrected. Further, each correction, if performed in the manner taught by the prior art, must involve an expansion of date fields, or some windowing technique; a revision of job control languages to cope with the date field change and the alteration of each application in such a manner as to accommodate the changed date field.

A conventional format for decimal representation of the year, called "zoned decimal", is shown in FIG. 1 as four characters FnSn. Each n character represents a decimal digit of the year and is expressed as 0 to 9. The F character is always a hexadecimal F for printing purposes. The S character has possible values of C, D, E or F in hexidecimal, as spelled out by EBCDIC Standards, to show whether the whole data string is to be positive or negative for sign purposes.

From an examination of FIG. 1, it can be seen that conversion of the zoned decimal format to handle a full four digit date would require that programs be converted by expanding field lengths and changing all media and logic that handle the expanded field lengths. The. conversion process (i) is extraordinarily large, (ii) must be accomplished and in place as soon as possible to take care of the "year 2000" problem and (iii) requires that all cooperating programs be converted before they can be operated in conjunction with each other.

Accordingly, it is an object of this invention to provide a date format, which is compatible with widely used current date formats and whose use avoids ambiguous calculation results.

It is another object of this invention to provide a procedure for employing a date format that enables conventional as well as future programs to operate on such date format.

It is still another object of this invention to provide a memory media for operation in conjunction with a program operating on a computer for the processing of date data.

SUMMARY OF INVENTION

The present invention employs a pseudo zoned decimal format to represent date information. The pseudo zoned decimal format differs from the zoned decimal format in that the value of the character corresponding to the F character of the zoned decimal format is permitted to vary in hexidecimal value from 0 to E to represent century information, but is not permitted to have a value of F. This permits a range of 14 centuries from a base century.

The method of processing date data according to the present invention involves intercepting year date data that has a higher order field that contains a hexidecimal character and one or more data fields that contain the year information. Then it is detected whether the hexidecimal character field has a hexidecimal value in the range of 0 to E. If yes, the detected value is added to a base century to form the proper century for the year date.

The method according to the present invention in one preferred embodiment forms revised data containing the year and century information. The revised data may be made available to an application.

The intercepted data is prepared for print or display operations, by changing the value of the hexidecimal character in the higher order field of the year data in the revised data to an hexidecimal F.

In another preferred embodiment of the present invention, if the hexidecimal character in the higher order field of the date data is an F, the year date data is converted to a pseudo zoned decimal format. This is accomplished by assigning a value in the hexidecimal range of 0 to E that corresponds to the desired century.

A memory media according to the present invention includes control software for operation in conjunction with a program operating on a computer to process year date data. The memory media includes first means for intercepting year date data that has a higher order field that contains a hexidecimal character and one or more data fields that contain the year information. A second means detects whether the hexidecimal character field has a hexidecimal value in the range of 0 to E. If yes, a third means adds the detected value to a base century to form the proper century for the year date.

The memory media according to the present invention in one preferred embodiment has a fourth means for forming revised data containing the year and century information. The revised data may be made available to an application.

For print or display operations, the memory media may contain a fifth means for changing the hexidecimal value in the higher order field of the year data in the revised data to an hexidecimal F. If the second means detects that the hexidecimal character in the higher order field of the year date data is an F, a sixth means is operable to convert the date data to a pseudo zoned decimal format. This is accomplished by assigning the hexidecimal character a value in the hexidecimal range of 0 to E that corresponds to the desired century.

BRIEF DESCRIPTION OF DRAWINGS

Other and further objects, advantages and features of the present invention will be understood by reference to the following specification in conjunction with the accompanying drawings, in which like reference characters denote like elements of structure and:

FIG. 4 is a flow diagram, which illustrates the year date data processing procedure of this invention.

DESCRIPTION OF PREFERRED EMBODIMENT

Figure 1:
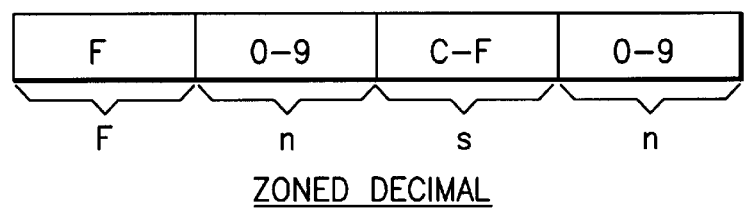
FIG. 1 is a schematic of zoned decimal format year designation.

Referring to FIG. 1, applications that compare year fields in zoned decimal will function properly up through 1999, but will fail for comparisons between anything 99 or below with 00 or above. For example, F9F8 compares lower than F9F9, but higher than F0F0. The value F9F8 represents 1998. The value F9F9 represents 1999. The value F0F0 is intended to represent 2000, but is the same as 1900, leading to confusion.

Figure 2:
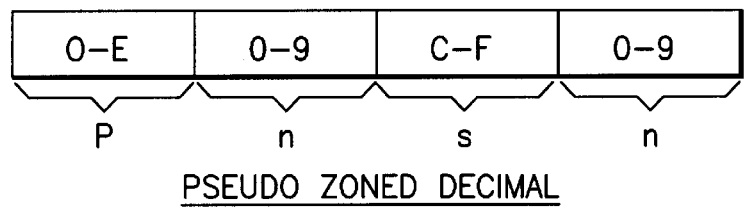
FIG. 2 is a schematic of a pseudo zoned decimal format year designation.

Referring to FIG. 2, the present invention employs a pseudo zoned decimal format to represent date information. The pseudo zoned decimal format differs from the zoned decimal format in that the value of P is permitted to vary in hexidecimal value from 0 to E to represent century information. P is not permitted to have an F value so as to distinguish from a zoned decimal format. This permits a range of 14 centuries from a base century. Thus, if the base century is chosen as 1900, the range extends from 1900 to 3399.

The value of P is added to a base century to obtain the correct century. For example, if the base century is 1900, 09F8 compares lower than 09F9 and lower than 10F0 and represents 1998. The values 09F9 and 10F0 represent 1999 and 2000, respectively. The comparison is seamless when a century line is crossed. Applications that compare year fields in pseudo zoned decimal will function properly up through 3399 without failure, if 1900 is used as the base century.

Figure 3:
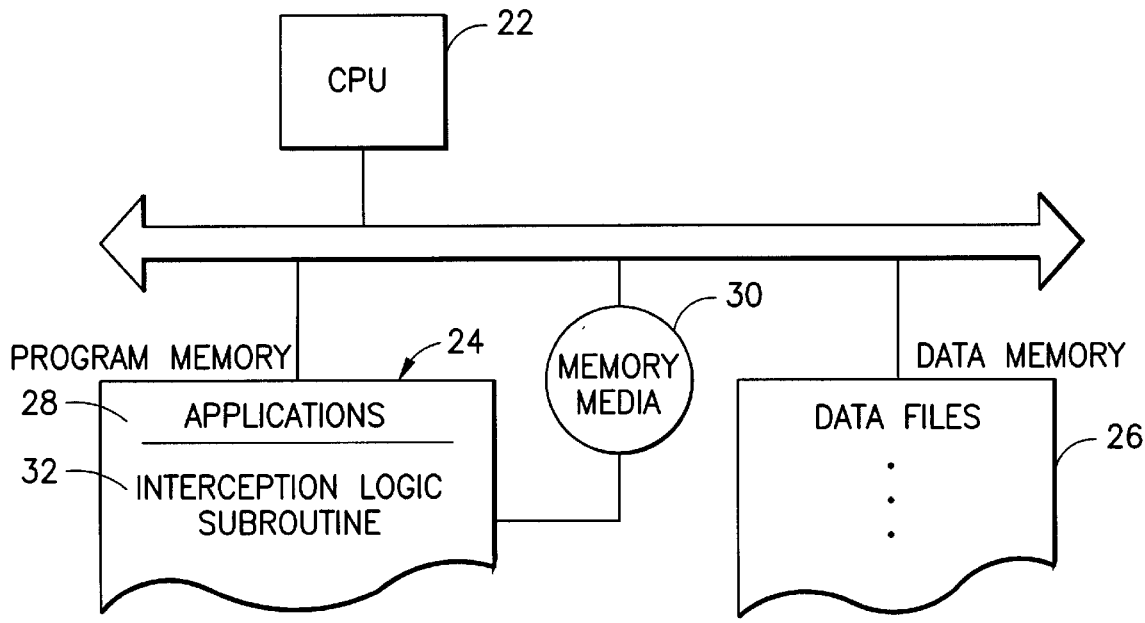
FIG. 3 is a high level block diagram of a computer system which employs the year date data processing procedure of the present invention.

FIG. 3 illustrates a computer system adapted to carry out the method of the invention. A central processing unit (CPU) 22 is coupled to a program memory 24, which includes various applications 28, and an intercept logic module 32. A data memory 26 includes plural files of data that are accessed and altered by applications 28 within program memory 24. Intercept logic subroutine 32 may also be stored in a memory media 30. Intercept logic subroutine 32 may be loaded from memory media 30 into program memory 24.

When a running application 28 accesses data from data memory 26 that expresses year data, intercept logic subroutine 32 is called to interpret, to revise the year data and/or to prepare it for printing as required by the application. Referring to FIG. 4, the running application is signified by box 48. Intercept logic subroutine 32 first examines the accessed data at step 49 for recognition of a year date. If the data does not contain a year date, control is returned to run application box 48. If the data does contain a year date, the procedure moves to step 51.

Intercept logic subroutine 32 next examines the data at step 51 to determine if it is in pseudo zoned decimal format. If not, the year date data is converted at step 53 to a pseudo zoned decimal format. This is accomplished by changing the F character to an hexidecimal value in the range from 0 to E depending on the desired century. The converted data is then returned to the application.

If the data is in pseudo zoned decimal format, the procedure moves on to step 55 where revised data of the year data and the century is formed. The value of the hexidecimal character in the higher order field is added to the base century to obtain the proper century. The revised data includes the year data fields and century data fields.

Next, it is determined at step 57 whether the application needs to print or display the year date. If not, the revised data is sent to the application at step 59. If yes, the hexidecimal character in the higher order field of the year data is changed to an F at step 61 so that print and display utilities of the application will recognize that the year data is to be printed or displayed. The modified data is then sent to the application at step 63.

Memory media 30 according to the present invention includes control software for operation in conjunction with a program operating on a computer to process year date data. Memory media 30 includes first means for intercepting year date data that has (a) a higher order field that contains a hexidecimal character and (b) one or more data fields that contain the year information. A second means detects whether the hexidecimal character has a hexidecimal value in the range of 0 to E. A third means adds the value so detected to a base century to form the proper century for the year date.

Memory media 30 according to the present invention in one preferred embodiment has a fourth means for forming revised data containing the year and century information. The revised data may be made available to an application.

For print or display operations, memory media 30 may contain a fifth means for preparing the revised data by changing the value of the hexidecimal character in the higher order field of the year data in the revised data to an hexidecimal F. If the second means detects that the hexidecimal character in the higher order field of the year date data is an F, a sixth means may be provided to convert the year date data to a pseudo zoned decimal format. This is accomplished by assigning the hexidecimal character a value in the hexidecimal range of 0 to E that corresponds to the desired century.

The present invention having been thus described with particular reference to the preferred forms thereof, it will be obvious that various changes and modifications may be made therein without departing from the spirit and scope of the present invention as defined in the appended claims.

What is claimed is:

1. A method for processing date data containing year information comprising:
    (a) intercepting date data that at least comprises two bytes from an application, said date data having a higher order field that contains a hexidecimal character and one or more date fields;
    (b) detecting whether said hexidecimal character has a hexidecimal value in the range of 0 to E, each such value representing a different century; and
    (c) if said hexidecimal value is in said range, adding said hexidecimal value to a base century to form a proper century value for said date data.

2. The method according to claim 1, further comprising the step of (d) forming revised data containing said proper century value.

3. The method according to claim 2, wherein said revised data is made available to said application.

4. The method according to claim 3, further comprising: (e) if said revised data is to be printed or displayed, changing said hexidecimal character in said revised data to an F.

5. The method according to claim 1, further comprising skipping steps (c), (d) and (e) if said detected hexidecimal value is F, and (f) converting said date data to a pseudo zoned decimal format by changing said hexidecimal character to a value in the range of from 0 to E in accordance with century data.

6. A method of processing date data containing year information comprising:

intercepting date data that at least comprises two bytes from an application, said date data having a higher order field that contains a hexidecimal character and one or more data fields;

detecting whether said hexidecimal character field has a hexidecimal value of F; and if said hexidecimal value is F, converting said date data to a pseudo zoned decimal format by changing said hexidecimal character to a value in the range of from 0 to E in accordance with century data.

7. A memory media including control software for operation in conjunction with a program operating on a computer, said program processing date data, said memory media comprising:

first means for intercepting said date data, said date data at least comprising two bytes from an application, said date data having a higher order field that contains a hexidecimal character and one or more date fields;

second means for detecting whether said hexidecimal character has a hexidecimal value in the range of 0 to E, each such value representing a different century; and third means for adding said hexidecimal value to a base century to form the proper century value for said year date.

8. The memory media according to claim 7, further comprising fourth means for forming revised data containing said proper century value.

9. The memory media according to claim 8, further comprising fifth means for preparing said revised data for a print or display operation by changing said hexidecimal character in said revised data to an F.

10. The memory media according to claim 9, further comprising sixth means operable, if said detected hexidecimal value is F, for converting said date data to a pseudo zoned decimal format by changing said hexidecimal value to a value in the range of from 0 to E in accordance with century data.

* * * * *